(12) United States Patent
Miller et al.

(10) Patent No.: US 8,805,296 B2
(45) Date of Patent: Aug. 12, 2014

(54) FIELD PROGRAMMABLE TRANSCEIVER CIRCUITS

(75) Inventors: Robin James Miller, Basingstoke (GB); Srdjan Milenkovic, Woking (GB); Ebrahim Bushehri, London (GB)

(73) Assignee: Lime Microsystems Limited, Haselmere (GB)

( * ) Notice: Subject to any disclaimer, the term of this patent is extended or adjusted under 35 U.S.C. 154(b) by 79 days.

(21) Appl. No.: 13/358,895

(22) Filed: Jan. 26, 2012

(65) Prior Publication Data

US 2013/0195151 A1    Aug. 1, 2013

(51) Int. Cl.
*H04B 1/38* (2006.01)

(52) U.S. Cl.
USPC ............................................. 455/73; 455/76

(58) Field of Classification Search
USPC .......................................................... 455/73
See application file for complete search history.

(56) References Cited

U.S. PATENT DOCUMENTS

| | | | |
|---|---|---|---|
| 1,666,206 A | 1/1925 | Hartley | |
| 6,236,840 B1 | 5/2001 | Aihara et al. | |
| 2004/0203472 A1 | 10/2004 | Chien | |
| 2006/0126754 A1* | 6/2006 | Filimonov et al. | 375/296 |
| 2007/0211837 A1* | 9/2007 | Zipper | 375/350 |
| 2007/0285154 A1 | 12/2007 | Darabi et al. | |
| 2007/0293163 A1* | 12/2007 | Kilpatrick et al. | 455/84 |
| 2010/0202496 A1 | 8/2010 | Hoyos et al. | |
| 2011/0057682 A1 | 3/2011 | Bohn et al. | |
| 2011/0140864 A1* | 6/2011 | Bucci | 340/10.42 |
| 2011/0143791 A1* | 6/2011 | Pan et al. | 455/500 |
| 2012/0250534 A1* | 10/2012 | Langer et al. | 370/252 |
| 2013/0017793 A1* | 1/2013 | Henttonen et al. | 455/63.1 |

FOREIGN PATENT DOCUMENTS

| | | |
|---|---|---|
| CN | 102185619 A | 9/2011 |
| WO | 0120795 A2 | 3/2001 |
| WO | 03061174 A2 | 7/2003 |

OTHER PUBLICATIONS

Becker et al.; "A Continuous-Time Field Programmable Analog Array (FPAA) Consisting of Digitally Reconfigurabte GM-Cells"; ISCAS; 2004; pp. I-1092 to I-1095; 0-7803-8251-X/04; IEEE; Freiburg, Germany.

Razavi; "Design Considerations for Direct-Conversion Receivers"; IEEE Transactions on Circuits and Systems-II: Analog and Digital Signal Processing; Jun. 1997; pp. 428-435; vol. 44, No. 6; IEEE; USA.

Weaver; "A Third Method of Generation and Detection of Single-Sideband Signals"; Proceedings of the IRE; Jun. 1956; pp. 1703-1705; USA.

* cited by examiner

*Primary Examiner* — Creighton Smith
(74) *Attorney, Agent, or Firm* — Fraser Clemens Martin & Miller LLC; William J. Clemens

(57) ABSTRACT

A transceiver circuit includes: a transmit path with at least one of each of a digital to analog converter converting a digital input signal to an analog signal, a filter, a first frequency synthesizer, a mixer to produce an RF output, and an amplifier amplifying the RF output for transmission; and a receive path with at least one of each of a second amplifier amplifying a received RF input, a second frequency synthesizer, a second mixer to produce a baseband signal, a second filter, and an analog to digital converter converting the baseband signal to a digital output signal; at least one switch selectively connecting different points of the circuit thereby to bypass at least one component of the circuit; and a control input connected to the switch to receive control signals for controlling operation of the switch.

20 Claims, 2 Drawing Sheets

FIELD PROGRAMMABLE TRANSCEIVER CIRCUITS

FIELD OF THE INVENTION

The present invention relates to transceiver circuits, and in particular radio frequency field programmable transceiver integrated circuits ICs for multi-band multi-standard wireless equipment.

BACKGROUND TO THE INVENTION

Radio systems use high frequencies to transport data from one location to another. The signal levels and frequencies involved require careful design of the component blocks within the radio/wireless interface. For this reason, integrated circuits that provide the functionality of a radio system tend to comprise dedicated components for a specific purpose interconnected in an optimum way for operation.

The homodyne, otherwise known as Zero IF structure, mixes the radio frequency carrier down in frequency to DC and the data, modulated on the carrier, is mixed to a frequency from DC to half the transmission bandwidth. It is a system that has been used for many years for data communication. In transmission, the data is provided in two data streams, the two streams being phase separated by 90°. The data is then mixed with a local oscillator that also has two signals phase related by 90° and the output of the transmit mixer is summed to create a composite signal.

Low IF, where the carrier is mixed to a low intermediate frequency rather than DC has also been widely used, offering the advantage over zero IF that the center of the band is not at DC so that offsets caused by carrier leak and production tolerances can be easily circumvented. Low IF has the problem that the image channel rejection is wholly dependent on the accuracy of the 90° phase difference between the two channels, whereas with zero IF the phase imbalance manifests as a reduction in EVM error vector magnitude due to the baseband signal mapping into the opposing spectra. Also, with low IF, the whole RF bandwidth is mapped either side of the chosen IF frequency, compared with half this for zero IF. The advantage of the Zero IF and Low IF systems over standard superhetrodyne systems is that the use of low frequencies allows the use of circuits with more easily achievable specifications. The disadvantage is that a quadrature phase system must be accurate and the circuit complexity is double that of a simple higher frequency IF heterodyne system. The system is well suited for integration onto silicon, since accurate high frequency filtering is not necessary and circuit area is less important than in the discrete version.

Integrated circuit technology is often targeted for a specific application. This is especially true for radio systems where the nature of RF circuits requires careful consideration of the various elements and parasitic components in order to provide the required overall RF performance. As a result, application areas outside the target application often need additional components in combination with the integrated circuit to make the product meet the required specification and the total manufacturing cost is elevated.

Generally, user programmable circuits known as Field Programmable Gate Arrays FPGAs are exclusively digital and cannot be used for analogue signal processing. Similarly, Complex Programmable Logic Devices CPLDs and Programmable System-on-Chip devices are also purely digital. Field Programmable Analog Array cells are analogue array based, but these are generally based on a single repeated cell that can be used for analogue baseband processing See FPAA product range from Anadigm -ANAD 2011(www.anadiqm-.com/fpaa.asp: Software Download Anadigm Designer 2). None of these products are suitable for RF signals used in the configurations required for transceiver ICs, and all of them are too non-specific for the wireless industry. Component arrays such as those produced by Diodes Incorporated formerly Zetec are simply a selection of analogue components that are too non-specific to be used at RF and are designed to be used at low frequencies.

SUMMARY OF THE INVENTION

The present invention provides a transceiver circuit comprising a transmit path and a receive path. The transmit path may comprise any one or more of: digital to analogue conversion means for converting a digital input signal to an analogue signal, filtering means for filtering the analogue signal, first frequency synthesizing means for producing a first synthesized RF signal, mixing means for mixing the analogue signal with the RF signal to produce an RF output, and amplifying means for amplifying the RF output for transmission. The receive path may comprise any one or more of: second amplification means for amplifying a received RF input, second frequency synthesizing means for generating a second synthesized RF signal, second mixing means for mixing the amplified RF input with the second synthesized RF signal to produce a baseband signal, second filtering means for filtering the baseband signal, and analogue to digital conversion means for converting the baseband signal to a digital output signal. The circuit may further comprise switching means arranged to selectively connect together different points of the circuit thereby to bypass at least one component of the circuit. That at least one component can be any one or more of the components or functional blocks of the circuit. The circuit may further comprise a control input means connected to the switching means and arranged to receive control signals for controlling operation of the switching means.

The circuit may further comprise digital signal processing means arranged to process the digital input signal before it is input to the digital to analogue conversion means. The digital signal into the DAC may be preconditioned using the digital signal processing to alleviate minor phase differences, amplitude variations or additional filtering prior to baseband processing or some other digital signal processing function as may be required by the user.

The circuit may further comprise digital signal processing means arranged to process the digital output signal. The digital signal from the ADC may be further treated using the digital signal processing to alleviate minor phase differences, amplitude variations or additional filtering prior to baseband processing or some other digital signal processing function as may be required by the user.

The circuit may further comprise third amplification means arranged to amplify the filtered analogue signal and fourth amplification means arranged to amplify the filtered baseband signal.

The circuit may further comprise a plurality connection means at different points in the circuit, arranged to enable additional components to be connected into the circuit. These may be arranged in pairs.

The gain of at least one of the amplification means may be variable and may have a control input connected to the control input means whereby a gain control signal can be input to the control input.

At least one of the amplification means may comprise a plurality of amplifiers and the switching means may be arranged to select which of the amplifiers is connected into the circuit thereby to select the gain of the amplification means.

The gain of at least one of the filtering means may be variable and may have a filter control input connected to the control input means whereby a filter control signal can be input to the filter control input.

At least one of the filtering means may comprise a plurality of filters and the switching means may be arranged to select which of the filters is connected into the circuit thereby to select the filter characteristics of the filtering means.

At least one of the synthesizing means may have a variable output frequency and may have a frequency control input connected to the control input means whereby a frequency control signal can be input to the frequency control input.

At least one of the synthesizing means may comprise a plurality of synthesizers and the switching means may be arranged to select which of the synthesizers is connected into the circuit thereby to select the output frequency of the synthesizing means.

The circuit may further comprise an analogue connection connected to the transmit path at a point between the digital to analogue conversion means and the mixing means to enable analogue signals to be input to, or out put from, the transmit path.

The circuit may further comprise an analogue connection connected to the receive path at a point between the analogue to digital conversion means and the mixing means to enable analogue signals to be input to, or out put from, the receive path.

Each of the transmit path and the receive path may comprise two channels arranged to carry different phase components of the analogue signals.

The circuit may further comprise a bus. The switching means may be arranged to selectively connect at least one point in the circuit to the bus. The at least one point may include any one or more of the inputs and outputs of each of the components of the circuit.

The bus may have two channels each arranged for connection to a respective one of the channels of the transmit and receive path.

The present invention provides a transceiver circuit comprising a transmit path and a receive path. The transmit path may comprise any one or more of: at least one digital to analogue converter for converting a digital input signal to an analogue signal, at least one filter for filtering the analogue signal, at least one first frequency synthesizer for producing a first synthesized RF signal, at least one mixer for mixing the analogue signal with the RF signal to produce an RF output, and at least one amplifier for amplifying the RF output for transmission. The receive path may comprise any one or more of: at least one second amplifier for amplifying a received RF input, a second frequency synthesizer for generating a second synthesized RF signal, at least one second mixer for mixing the amplified RF input with the second synthesized RF signal to produce a baseband signal, at least one second filter for filtering the baseband signal, and at least one analogue to digital converter for converting the baseband signal to a digital output signal. The circuit may further comprise at least one switch, or a switching circuit, arranged to selectively connect together different points of the circuit thereby to bypass at least one component of the circuit. That at least one component can be any one or more of the components or functional blocks of the circuit. The circuit may further comprise a control input connected to the at least one switch and arranged to receive control signals for controlling operation of the at least one switch.

The circuit may further comprise at least one digital signal processor arranged to process the digital input signal before it is input to the digital to analogue converter.

The digital signal into the DAC may be preconditioned using the digital signal processing to alleviate minor phase differences, amplitude variations or additional filtering prior to baseband processing or some other digital signal processing function as may be required by the user.

The circuit may further comprise at least one digital signal processor arranged to process the digital output signal. The digital signal from the ADC may be further treated using the digital signal processing to alleviate minor phase differences, amplitude variations or additional filtering prior to baseband processing or some other digital signal processing function as may be required by the user.

The circuit may further comprise at least one third amplifier arranged to amplify the filtered analogue signal and at least one fourth amplifier arranged to amplify the filtered baseband signal.

The circuit may further comprise a plurality of connections at different points in the circuit, arranged to enable additional components to be connected into the circuit. These may be arranged in pairs.

The gain of at least one of the amplifiers may be variable and may have a control connection connected to the control input means whereby a gain control signal can be input to the control connection.

The at least amplifier may comprise a plurality of amplifiers and the at least one switch may be arranged to select which of the amplifiers is connected into the circuit thereby to select the gain of the at least one amplifier.

The gain of at least one of the filters may be variable and may have a filter control connection connected to the control input whereby a filter control signal can be input to the filter control connection.

The at least one filter may comprise a plurality of filters and the at least one switch may be arranged to select which of the filters is connected into the circuit thereby to select the filter characteristics of the at least one filter.

At least one of the synthesizers may have a variable output frequency and may have a frequency control connection connected to the control input whereby a frequency control signal can be input to the frequency control connection.

The at least one of the synthesizer may comprise a plurality of synthesizers and the at least one switch may be arranged to select which of the synthesizers is connected into the circuit thereby to select the output frequency of the at least one synthesizer.

The circuit may further comprise an analogue connection connected to the transmit path at a point between the digital to analogue conversion means and the mixing means to enable analogue signals to be input to, or out put from, the transmit path.

The circuit may further comprise an analogue connection connected to the receive path at a point between the analogue to digital conversion means and the mixing means to enable analogue signals to be input to, or out put from, the receive path.

Each of the transmit path and the receive path may comprise two channels arranged to carry different phase components of the analogue signals.

The circuit may further comprise a bus. The switching means may be arranged to selectively connect at least one point in the circuit to the bus. The at least one point may include any one or more of the inputs and outputs of each of the components of the circuit.

The present invention provides an integrated device comprising a plurality of functional blocks and a system of switches that enables the user to use and re-use the various functional blocks for a multiple of purposes in the context of an RF transceiver for wireless applications. These blocks may be used in isolation to reduce stocking costs, or may be re-used when applications are appropriate e.g. radio telemetry. Arrays of functional blocks can be configured for the end application in the application circuit. As a result, the device may be referred to as a Radio Frequency Field Programmable Function Array RF FPFA.

The device may comprise a separate transmitter and receiver and may comprise any one or more of the following:

a. A complex switching circuit to bypass various function blocks as described in the detailed description of the invention. The transmitter may comprise any one or more of a MUX, DACs, Filters, mixer and Gain Stages. Any one or more of these may have an associated bypass switch so that it can be bypassed and if required replaced by external components. Likewise, the receiver may comprise any one or more of multiple LNAs and mixers, Gain stages, Filters, ADCs and MUX, and any one or more of these may have an associated bypass switch so that it can be bypassed and if required replaced by external components.

b. Connections may be provided at various nodes within the device to connect or monitor analogue signals, for example as described in the detailed description of the preferred embodiments. This may comprise a number of switches that connect a number of nodes within the circuit, for example to either an external pin or optionally to an internal bus that can connect to other functions or points in the circuit.

c. A complex switching circuit may be included to connect between transmit and receive paths of the device, enabling the baseband blocks or circuit components to be used independently of the RF blocks or circuit components.

d. A plurality of inputs may be included for receiving a Radio frequency RF signal e. A plurality of low-noise amplifiers may be included that are designed for RF frequencies, and the device may include internal switches to select the active amplifier f. A plurality of independent frequency synthesizers may be included to generate local RF oscillator (LO) signals. Each of the synthesizers may provide two signals at the same frequency but phase related, with a nominal 90° phase relationship.

g. A number of receiver mixer circuits may be included to multiply the LO and RF signals and generate a third intermediate frequency (IF) signal, and the device may include an integral switching network for input selection.

h. A number of complex mixer circuits may be included to multiply the baseband signal with a local RF signal and generate an RF signal, which may be a forth RF signal, suitable for transmission.

i. A number of, which may be four, variable gain amplifiers to amplify the receiver IF signal, two of which may be bypassed, or may be used independently, with or without signal filtering via the receiver filter block.

j. A number of, which may be two, variable gain amplifiers may be included to amplify the transmitter IF signal, that may be bypassed or re-configured as independent amplifiers, with or without signal pre-conditioning.

k. A number of, which may be two pairs of two, filters may be included, whose bandwidth may be variable and may be independent from each pair, that may be bypassed should different filtering requirements be desired l. A number of, which may be two, analog to digital converters may be included, that may be used independently from the rest of the receiver circuit m. A number of, which may be two, digital signal processors may be included, that may be used independently from the rest of the receiver circuit n. A digital signal output from each of the analog to digital converters may be included that may be multiplexed to a single bus.

o. A number of, which may be two, digital to analog converters may be included, that may be used independently from the rest of the receiver.

p. A multiplexed digital signal input to a de-multiplexor may be included to create two independent signals to the digital to analog converters.

q. A number of, which may be two RF amplifiers may be included that provide high power RF signal for transmission that can be switched in or out of use.

r. A number of independent outputs may be included to transmit a radio frequency RF signal that may be used at different frequencies.

Any combination of these components may be arranged to 1 form the basis of a RF Field Programmable Function Array, since the functions that are used are both programmable and independently selectable on use. This system is preferably designed for use at radio frequencies, for example above 300 MHz, and may form a programmable RF and Analog system.

In systems according to the invention, a number of functional blocks may be implemented. These may include any one or more of the following features:

a) A complex switching function that enables various functional blocks to be included, or not included, in the signal path, and together with the various external connections enables different blocks to be used in isolation if this is desired.

b) The functions of transmit and receive are performed using a zero frequency baseband IF function. To ensure transmission is made at a single frequency, image rejection may be performed by having a quadrature phase related signal for both transmit and receive functions.

c) Three independent RF LNA's are available for use on the receive side. Each may be independently selected using the various switches and used at the same or different frequencies.

d) Each LNA has an associated mixer so that either a separate RF input may be used for different applications, or a mixture of internal LNA and external input may be used.

e) Two independent RF output stages for the transmitter that may be used for different frequencies. These are selectable using the internal switch bank.

f) The transmit filters have a programmable bandwidth defined by a control bus. The receive filters also have programmable bandwidth. The bandwidths of the filters may be independently defined. The filters may be included in the final circuit or not depending on the end application by configuring the various switches. They may also be used as filters for external applications when the device is not used as a transmitter or receiver.

g) Each amplifier in the chain can have a variable gain and may be programmed with different gains. Certain amplifiers may also be bypassed and in the receiver or transmitter chain, or by the use of the complex switching, used as independent amplifiers.

h) Two DAC's and two ADC's have also been integrated to provide a digital interface. These may be used for external purposes e.g. data collection prior to transmission then re-configured to be used for normal wireless transmission and handshaking.

i) Two digital signal processing blocks provide pre and post signal conditioning prior to transmission or signal decoding by some post processing function.

The device may comprise any one or more of the functional blocks, or components, or switches, described as part of one of the preferred embodiments below. Those preferred embodiments will now be described by way of example only with reference to the accompanying drawings,

DESCRIPTION OF THE PREFERRED EMBODIMENTS

Figure 1:
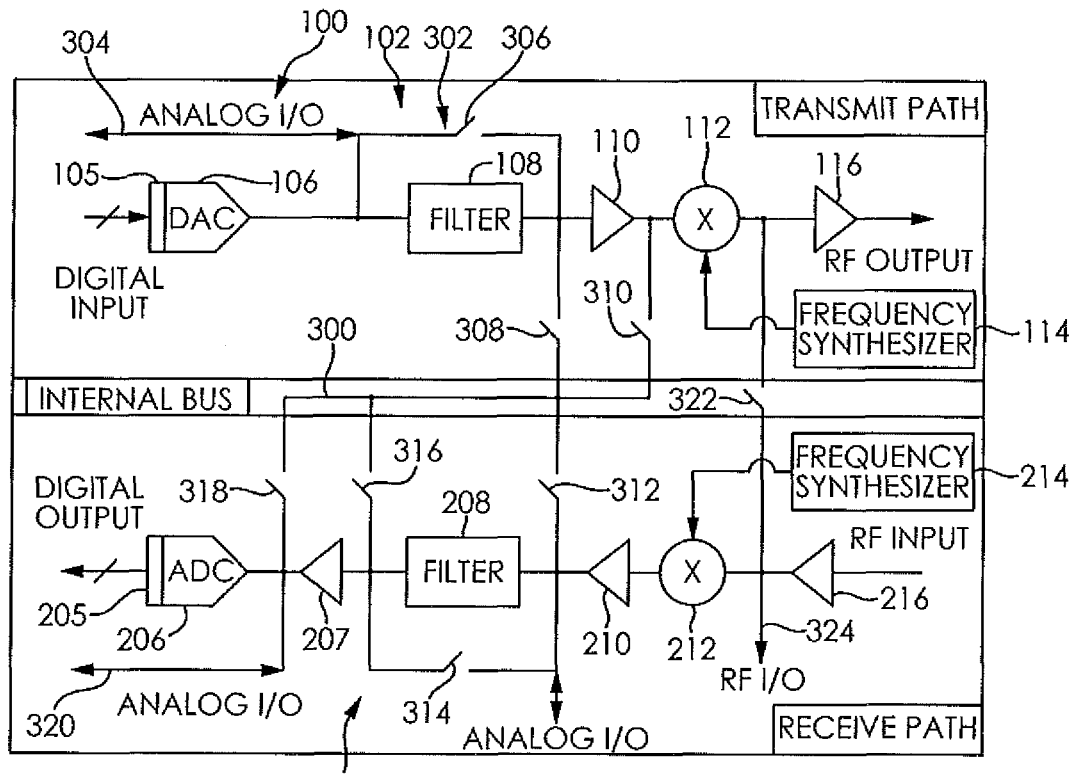
FIG. 1 is a diagram of a circuit according to a first embodiment of the invention.

Referring to FIG. 1, in one embodiment of the invention a field programmable transceiver circuit 100 comprises a number of functional blocks forming a transmit path 102 and a number of functional blocks forming a receive path 104. The transmit path 102 comprises a DAC block 106 having an input arranged to receive digital input and an analogue output, a filter block 108 connected to the output of the DAC block 106 and arranged to receive the analogue output from the DAC block 106 and filter it, a low noise amplifier LNA block 110 arranged to receive the output from the filter block 108 and amplify it, a mixer block 112 arranged to mix the output form the LNA block 110 with RF signals from a frequency synthesizer block 114 to produce an RF output, and a further LNA block 116 arranged to amplify the RF output for transmission. The receive path 104 comprises a LNA block 216 arranged to receive RF input, a mixer block 212 arranged to mix the output from the LNA block 216 with RF signals from a frequency synthesizer block 214 to generate baseband signals, a further LNA block 210 arranged to receive and amplify the baseband signals, a filter block 208 arranged to receive and filter the output from the LNA block 210, a further amplifier block 207 arranged to amplify the output from the filter block 208, and an ADC block 206 arranged to digitize the output from the amplifier block 207 to generate digital output. A digital signal processor block 105 may be provided in the circuit to process the input to the DAC block 106, and a further digital signal processor block 205 may be included to process the out put form the ADC block 206.

The circuit further comprises an internal bus 300 and a switching circuit 302 which connects various points in the transmit and receive circuits to the internal bus and to each other via switches, so that various components or functional blocks of the circuit can be switched into and out of the circuit, and the circuit can be re-configured as required to meet different requirements for different applications. The output of the DAC block 106 is connected to an analogue input/output connection 304. The output of the filter block 108 is also selectively connected to the analogue input/output connection via a switch 306, which also therefore selectively connects together the input and output of the filter block 108. The output of the filter block 108 is also selectively connected to the internal bus 300 via a switch 308. The output of the LNA block 110 is also selectively connected to the internal bus 300 via a switch 310. On the receive side of the circuit, the output of the LNA block 210 is also selectively connected to the internal bus 300 via a switch 312. The output of the filter block 208 is selectively connected to the input of the filter block 208 via a switch 314. The output of the filter block 208 is also selectively connected to the internal bus 300 via a switch 316. The output of the LNA block 207 is selectively connected to the internal bus 300 via a switch 318, and is also connected to a further analogue input/output connection 320. The output from the mixer 112 on the transmit side is selectively connected to the input of the mixer 212 on the received side by a switch 322, and the input of the mixer 212 on the receive side is also connected to an RF input/output 324.

The circuit as shown in FIG. 1 is made up of a number of functional blocks. In practice each of these may comprise a single component, or may comprise a plurality of components. Furthermore, each of the transmit and receive channels may be duplicated so that two phase related components I & Q channels are used, as required by the Zero IF configuration. The device in its default configuration is a transceiver but each of the functional blocks may be removed from the configuration by the operation of the appropriate switches in the switching circuit, and either a different external functional block may be used for the task, or the functional block may be used in isolation.

Figure 2:
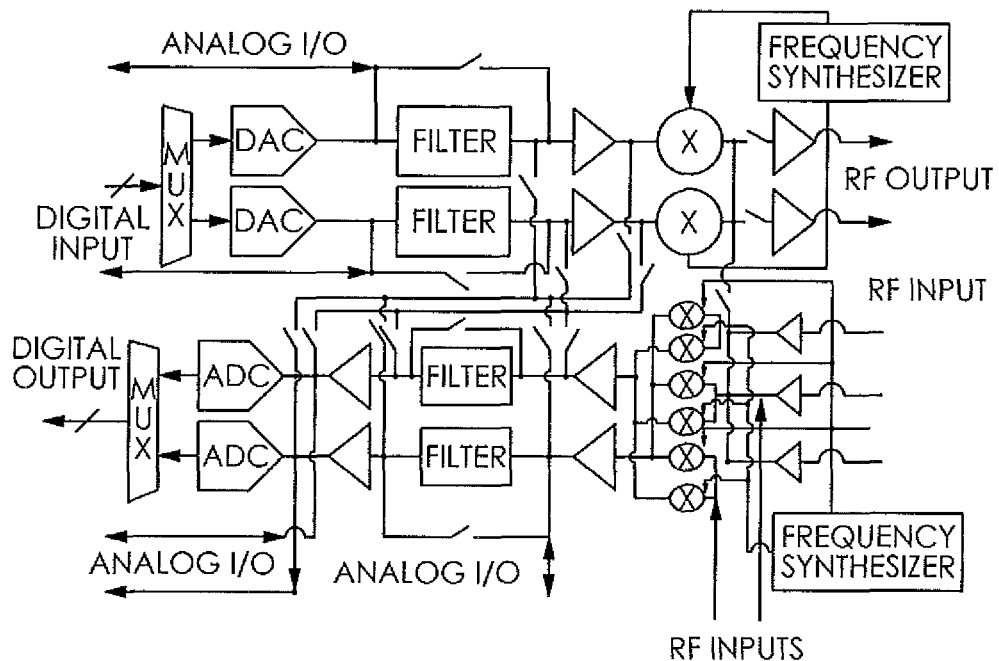
FIG. 2 is a diagram of a circuit according to a second embodiment of the invention.
Figure 3:
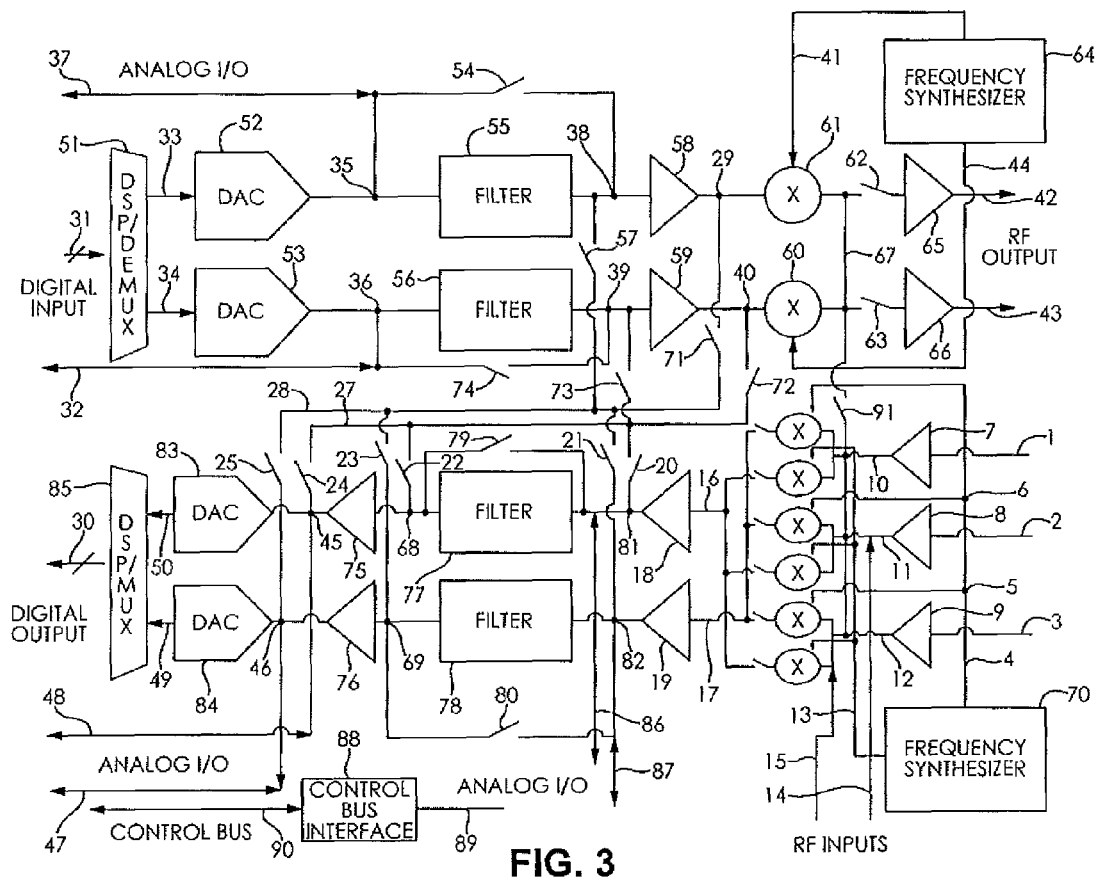
FIG. 3 is a diagram similar to FIG. 2 with reference numerals.

Referring to FIGS. 2 and 3, a circuit according to a second embodiment of the invention comprises a transmit path and a receive path, and a bus structure that permits re-routing of the signals from one signal path to the other, thereby permitting re-use of the circuit elements. This circuit includes all of the functional blocks of the embodiment of FIG. 1 and is arranged to operate in the same basic manner.

Transmit Path

The transmit path has a digital input 31 and two analogue bidirectional input/outputs 32 and 37 each of which can be switched into and out of the circuit. The digital input 31 is arranged to receive multiplexed digital data that contains data for both the I and Q channels. A digital signal processor (DSP) and multiplexer (MUX) 51 is arranged to de-multiplex the input data and pre-condition the digital signal. The DSP is arranged to precondition the digital input signal using digital signal processing to alleviate minor phase differences, amplitude variations or additional filtering prior to baseband processing or some other digital signal processing function as may be required by the user. The multiplexer is arranged to produce two digital data streams 33 and 34, representing the 1 and Q channel data respectively. Two digital to analogue converters (DACs) 52, 53 are each arranged to receive as input data from one of the data channels, and to convert the data to an analogue signal, including a component at a baseband frequency range, so as to produce analogue data at respective nodes 35 and 36. The outputs of the DAC's 52, 53 are also connected to the bidirectional input/output pins 32, 37 so that those baseband analogue signals may also be monitored or used independently via the bidirectional input/output pins 32 and 37. These analogue signals are fed to the inputs of the filters 55 and 56, which are connected to the outputs from the DACs 52, 53, and whose bandwidths are variable and may be controlled using a control input which can be provided by a separate data control bus 89 which is connected to control inputs of the filters 55, 56. The input and output of each of these filters are connected together via a bypass switch 54, 74 so that they may be bypassed using the switches 54 and 74 so that enhanced filtering may be substituted if required. Using the switches 54, 74 and external analogue I/O's 32, 37 provides the facility of feeding signals directly onto each of the internal nodes 38 and 39 which are each connected to the output of one of the filters 55, 56. These nodes 38 and 39, which are each arranged to sum the signals from the bypass switch 54, 74 with the signal from the filter 55, 56 to which it is connected The nodes 38, 39 are also each connected to the input of a respective amplifier 58, 59 which is arranged to amplify the summed signals. The outputs of the filters 55, 56 are also each connected to a respective one of the two internal busses 27 and 28 via switches 57 and 73, so that the can be selectively connected to those busses for applications that demand it.

The outputs of amplifiers 58 and 59 are each connected to a respective node 29 and 40 that in turn is connected to a respective transmit mixer 61 and 60. These nodes 29, 40 are also each connected to one of the internal busses 27 and 28 via switches 71 and 72 so that an amplified version of the filtered signal is available on the internal bus 27, 28. A transmit synthesizer 64 is arranged to generate two signals that are in phase quadrature and these are provided via nodes 41 and 44 to which the outputs of the transmit synthesizer 64 are connected. The frequency of the synthesizer 64 is variable and can be determined or selected by a frequency control signal which can be input to the synthesizer 64 via the control bus 89. One of the mixers 61 is fed with a baseband signal 29 and an RF signal 41, whilst the other mixer 60 is fed with a baseband signal 40 and an RF signal 44. The outputs of the two mixers 60, 61 are connected together at node 67 to produce a combined signal including the I and Q components. This combined signal can be fed to either one of the power amplifiers 65 or 66 via one of two switches 62 and 63 which each connect one of the amplifiers 65, 66 to the node 67, or can be fed to a receiver mixer 26 in the receiver side of the circuit via a switch 91, which selectively connects the node 67 to the receiver mixer 26, so that the RF signal may be monitored locally prior to transmission. The RF output frequency is determined by the frequency synthesizer 64, which is controlled by the control data bus 89 as described above. The output of each of the transmitter power amplifiers 65 and 66 is connected to a respective output pin 42, 43, so that the signal for transmission can be taken from one of the two pins 42 or 43, depending on which amplifier is being used. It is possible, but not essential, for these amplifiers 65, 66 to be used at different frequencies so that external matching networks can be optimised for the frequency of operation. With this flexibility, wide frequency differences such at 2.1 GHz and 700 MHz may be accommodated with the same device.

Receive Path

The receiver path has three low noise amplifiers 7, 8 & 9 whose inputs are directly accessed via respective analogue input pins 1, 2 & 3. The gain of each of the LNA's is controlled by a respective gain control signal which can be provided via the independent data control bus 89 which is connected to a control input of each of the LNA's. The selection of the appropriate LNA is also controlled via the data control bus 89. It is possible, but not essential, for these amplifiers 7, 8, 9 to be used at different frequencies so that external matching networks can be optimised for the frequency of operation. With this flexibility, wide frequency differences such at 2.10 Hz and 700 MHz may be accommodated with the same device. Only two of the amplifiers 7, 8, 9 could be provided, but a third amplifier is also provided in this embodiment so that channel monitoring e.g. GSM sniff may also be achieved without additional external components.

The output of each of the LNA's 7, 8, 9 is connected to the mixer block 26 directly and to a respective external pin so that an improved performance LNA may be substituted. Specifically the output of the LNA 8 is connected to a separate pair of pins 14 and the output of the LNA 9 is connected to a separate pair of pins 15 so the relevant LNA may be used in isolation if required, substituted or filtering added between the LNA and mixer. Pins 14 and 15 may in practice each comprise a pair of pins, each pair comprising one pin connected to an output from an LNA and one connected to an input to the corresponding mixer. Two such pairs of pins are shown, but a third pair for the third amplifier could be added if the package pin count was increased. The mixer block 26 is, in this embodiment, a complex mixer actually containing three separate pairs of mixers 6 mixers in total. Each pair of mixers is connected to the output of a respective one of the LNAs 7, 8 9, via a respective node 10, 11 or 12, and two of the mixer pairs are connected to one of the external input pins 14 or 15. On the diagram shown one mixer pair does not have an external input/output provided due to pin count restrictions, but there is no technical reason why it cannot have the same external pin configuration as the other two mixer pairs. The two mixers in each pair of mixers are also connected to, and fed with an RF signal from, the two outputs of a receiver frequency synthesizer 70, the two outputs providing signals in phase quadrature 4 & 13 to the two mixers in each pair. Nodes 5 and 6 show the parallel connection to each pair of mixers. A similar parallel connection exists for node 13. The outputs of one of each pair of mixers are connected together, and the outputs of the other of each pair of mixers are connected together. In each case the mixers having their outputs connected together are the three connected to the same output from the synthesizer 70, so that two baseband channels, containing the modulation data, exist, having a 90° phase difference between them at nodes 16 and 17 when the frequency synthesizer 70 is set to the same frequency as the RF input. These nodes 16, 17 are connected to the inputs of respective low noise baseband amplifiers 18 and 19, whose gains are variable and can be controlled by gain control signals provided via the control bus 89, which is connected to control inputs of the amplifiers. The receiver synthesizer 70 is completely independent from the transmitter synthesizer 64 and they may operate at completely different frequencies, selected and determined only by the control bus 89.

The output of the amplifiers 18 & 19 are connected to nodes 81 and 82 respectively, which in turn are connected to the inputs of respective filters 77 and 78, respective internal switches 20 and 21 and respective optional analogue I/O pins 86 and 87. These are optional since the total number of available pins may restrict their automatic inclusion in all variants of the device. The switches 20 and 21 selectively connect the outputs of each of the amplifiers 18 & 19 to a respective one of the internal busses 27 & 28 so that external filtering may be used if the external pins 86 and 87 are not available, or can be used for other purposes such as checking baseband data quality in loopback mode prior to transmission. The filters 77 and 78 define the receiver channel band width, these being variable and defined by bandwidth control signals which can be provided by the internal control bus 89 which is connected to the filters 77, 78 for that purpose. The input and output of each of the filters are connected together via a switch 79, 80 do that each of the filters may be bypassed using one of the switches 79 and 80 if not required. The output of each of the filters 77 and 78 is connected to a respective node 68 and 69, which in turn is connected to the input of a respective baseband amplifier 75 and 76, filter bypass switch 79, 80 and to a respective one of the internal busses 27 and 28 via a switch 22, 23. The output of each of the amplifiers 75, 76 is connected to a respective node 45 and 46, as well as one of the analogue I/O pins 47, 48, the respective analogue to digital converter 83, 84, and a respective one of the internal busses 28 and 27 via a respective switch 25 and 24. Pins 47 and 48 are bi-directional in that signals may be both monitored at this point by the various switch combinations, or may be used as a source to the different ADC 83, 84 inputs. Note that completely independent signals may be monitored at this point e.g. for two different sensors with only the sampling rate being common. The output of each ADC 83, 84 is connected to a respective node 50 and 49, and these outputs are connected to the input of a digital signal processor (DSP) and multiplexer 85 so that the signal can be pre-processed and multiplexed together via multiplexer 85 into digital data bus 30. The DSP is arranged to treat the digital signal further using digital signal processing to alleviate minor phase differences, amplitude variations or additional filtering prior to baseband processing or some other digital signal processing function as may be required by the user.

As previously stated, all switches, amplifier gains, synthesizer frequencies, configurations etc are arranged to be set independently by the control bus 89. To interface to an external control line, a control bus interface block 88 is necessary so that settings are static and pre-defined protocols are followed. For the example device, an SPI interface is used, but using a different control bus interface would enable I2C or other protocol type without any loss of functionality. The Control bus interface is controlled externally by control bus 90.

The advantage of the embodiments described is that the various functional blocks may be re-used for different applications when not being used for the primary function. The bypass options also provide a mechanism for adopting the same transceiver structure/design for any performance demanded by differing equipment specification. Some examples of the need for functional block re-use are given here:

- a) DAC and ADC re-use. In an industrial environment, the ADC block may be used to gather data over a period of time, processed and the data stored. After some period, the same data may be transmitted at an appropriate radio frequency. Control of the data flow during transmission is made by an external processor with handshaking controlled via the receiver and ADC which may now be used for this task. Handshaking may be achieved either by a time dependent duplex channel allocation (TDD) or by using a separate control frequency used for the purpose (FDD). The receiver and transmitter may be on the same or totally different frequencies so either process is applicable.
- b) The use of an external RFLNA may be required instead of using the internal function, or the use of the RF LNA as an isolated module without the mixer. This is an example of improving the specification of the device to meet a specific application need. Furthermore, the use of the mixer input as a means of using the device as an IF amplifier/demodulator for higher frequency systems (e.g. backhaul).
- c) Wireless networks By providing multiple I/O's, variable gain amplifiers and a range of filter bandwidths, many of the wireless specifications may be addressed, including (but not exclusive to) LTE, CDMA2000,WCDMA/HSPA, GSM (plus variants), WIMAX (802.16) and some of the wireless LAN (802.11b,g) may be addressed. Commonly, a range of devices are needed to address the needs of the different specifications.
- d) Base transceiver stations (BTS), which form the backbone of wireless cellular communication, come in different sizes of Femto, Pico, Micro and Macro form factors with increasing performance requirements. The FPRF structure can be used across all such platforms by bypassing any function that had inadequate performance and replacing it with an external high performance circuit. This extends the applicability of the structure from the lowest to highest performance application. As a way of clarification, Macro BTS requires an ultra low noise amplifier at the RF input of the Receiver chain, whereas a Femto BTS can use a more relaxed LNA specification. In this case, a design that is tailored to Femto Transceiver applications and noise performance has been traded for other gains, can be used as a Macro platform by bypassing the internal LNA and utilizing an equivalent external substitute with a significantly higher performance. The key advantage from a designer's prospective is the costs of design and production may be minimised by providing a low cost Femto solution, whilst by accepting the modest increase in cost of a few replaced components, the same design may be used for a much higher performing platform.

The invention claimed is:

1. A transceiver circuit comprising a transmit path and a receive path, the transmit path comprising an input for receiving a digital input signal, digital to analogue conversion means for converting the digital input signal to an analogue signal, filtering means for filtering the analogue signal, first frequency synthesizing means for producing a first synthesized RF signal, mixing means for mixing the analogue signal with the RF signal to produce an RF output, and amplifying means for amplifying the RF output for transmission, the amplifying means having an output; and the receive path comprising an input for receiving an RF input, second amplification means for amplifying the RF input, second frequency synthesizing means for generating a second synthesized RF signal, second mixing means for mixing the amplified RF input with the second synthesized RF signal to produce a baseband signal, second filtering means for filtering the baseband signal, and analogue to digital conversion means for converting the baseband signal to a digital output signal, and an output for the digital output signal, switching means arranged to selectively connect together different points of the circuit thereby to bypass at least one component of the circuit and a control input means connected to the switching means and arranged to receive control signals for controlling operation of the switching means, and at least one further input and one further output connected to the at least one component whereby the at least one component can be connected for use in a different application.

2. A transceiver circuit according to claim 1 further comprising third amplification means arranged to amplify the filtered analogue signal and fourth amplification means arranged to amplify the filtered baseband signal.

3. A circuit according to claim 1 further comprising a plurality of pairs of connection means arranged to enable additional components to be connected into the circuit.

4. A circuit according to claim 1 wherein at least one of the amplification means has a gain which is variable and has a control input connected to the control input means whereby a gain control signal can be input to the control input.

5. A circuit according to claim 1 wherein at least one of the amplification means comprises a plurality of amplifiers and the switching means is arranged to select which of the amplifiers is connected into the circuit thereby to select the gain of the amplification means.

6. A circuit according to claim 1 wherein the gain of at least one of the filtering means is variable and has a filter control input connected to the control input means whereby a filter control signal can be input to the filter control input.

7. A circuit according to claim 1 wherein at least one of the filtering means comprises a plurality of filters and the switching means is arranged to selectively which of the filters is connected into the circuit thereby to select the filter characteristics of the filtering means.

8. A circuit according to claim 1 wherein at least one of the synthesizing means has a variable output frequency and has a frequency control input connected to the control input means whereby a frequency control signal can be input to the frequency control input.

9. A circuit according to claim 1 wherein at least one of the synthesizing means comprises a plurality of synthesizers and the switching means is arranged to selectively which of the synthesizers is connected into the circuit thereby to select the output frequency of the synthesizing means.

10. A circuit according to claim 1 further comprising an analogue connection connected to the transmit path at a point between the digital to analogue conversion means and the mixing means to enable analogue signals to be input to, or output from, the transmit path.

11. A circuit according to claim 1 further comprising an analogue connection connected to the receive path at a point between the analogue to digital conversion means and the mixing means to enable analogue signals to be input to, or output from, the receive path.

12. A circuit according to claim 1 wherein each of the transmit path and the receive path comprises two channels arranged to carry different phase components of the analogue signals.

13. A circuit according to claim 1 further comprising a bus, wherein the switching means are arranged to selectively connect at least one point in the circuit to the bus.

14. A circuit according to claim 13 wherein each of the transmit path and the receive path comprises two channels arranged to carry different phase components of the analogue signals, and the bus has two channels each arranged for connection to a respective one of the channels of the transmit and receive path.

15. A circuit according to claim 1 further comprising digital signal processing means arranged to process the digital input signal.

16. A circuit according to claim 1 further comprising digital signal processing means arranged to process the digital output signal.

17. A transceiver circuit comprising a transmit path and a receive path, the transmit path comprising an input for receiving a digital input signal, at least one digital to analogue converter for converting the digital input signal to an analogue signal, at least one filter for filtering the analogue signal, at least one first frequency synthesizer for producing a first synthesized RF signal, at least one mixer for mixing the analogue signal with the RF signal to produce an RF output, and at least one amplifier for amplifying the RF output for transmission, the at least one amplifier having an output; and the receive path comprising an input for receiving an RF input, at least one second amplifier for amplifying the RF input, at least one second frequency synthesizer for generating a second synthesized RF signal, at least one second mixer for mixing the amplified RF input with the second synthesized RF signal to produce a baseband signal, at least one second filter for filtering the baseband signal, and at least one analogue to digital converter for converting the baseband signal to a digital output signal, and an output for the digital output signal, at least one switch arranged to selectively connect together different points of the circuit thereby to bypass at least one component of the circuit and a control input connected to the at least one switch and arranged to receive control signals for controlling operation of the at least one switch, and at least one further input and one further output connected to the at least one component whereby the at least one component can be connected for use in a different application.

18. A transceiver circuit according to claim 17 further comprising at least one third amplifier arranged to amplify the filtered analogue signal and at least one fourth amplifier arranged to amplify the filtered baseband signal.

19. A circuit according to claim 17 further comprising a plurality of pairs of connectors arranged to enable additional components to be connected into the circuit.

20. A circuit according to claim 17 wherein at least one of the amplifiers has a gain which is variable and has a control connection connected to the control input whereby a gain control signal can be input to the control connection.

* * * * *